2,490,936

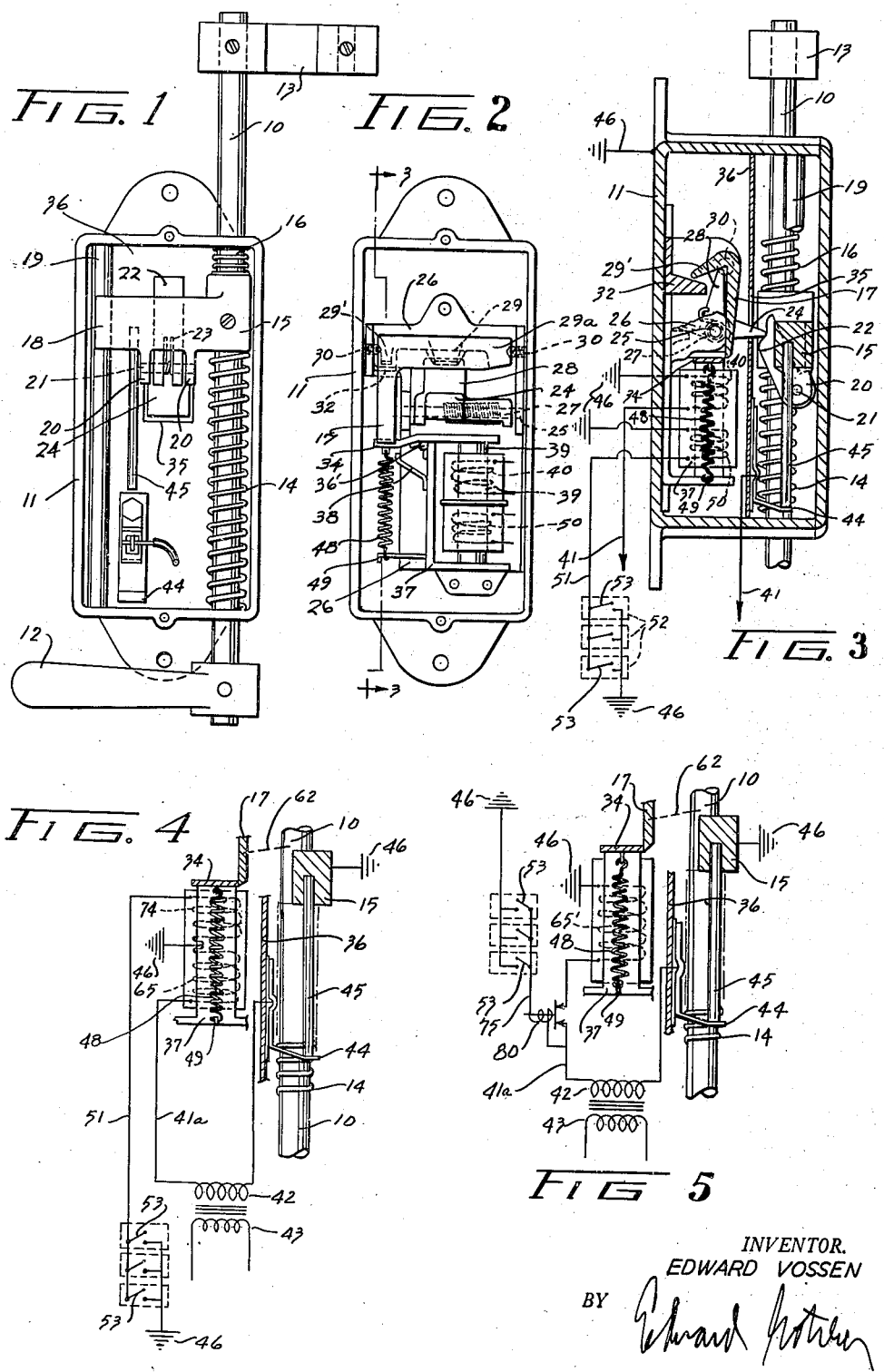
Dec. 13, 1949 — E. VOSSEN — 2,490,936
ELECTRIC CONTROLLER STOP-MOTION FOR MACHINES
Filed May 11, 1948
INVENTOR.
EDWARD VOSSEN
ATTORNEY Patented Dec. 13, 1949

UNITED STATES PATENT OFFICE 2,490,936

ELECTRIC CONTROLLER STOP MOTION FOR MACHINES

Edward Vossen, Lynbrook, N. Y., assignor to Stop-Motion Devices Corp., Brooklyn, N. Y., a corporation of New York Application May 11, 1948, Serial No. 26,335

8 Claims. (Cl. 66—157)

This invention relates to new and useful improvements in electric controller stop motions for machines.

The invention is an improvement upon electric stop motion controllers for knitting and other machines of the type shown in patent to E. Vossen, No. 2,285,237, patented June 2, 1942, in which the electro-magnet is energized only when a stop motion switch is closed in order that the electro-magnet may attract its armature and trip the mechanism which operates the control of the knitting or other machine. Controllers of this type embody one serious defect, namely, in the event of current failure the controller does not operate and the knitting machine, or other machine which the controller is protecting is in reality not protected at all. In the past it has happened infrequently that the current to the controller failed due to one reason or another, as for example in some cases the electric plug was accidentally kicked out of the electric socket. In certain instances one or more of the stop motion devices acted to stop the knitting machine because of a knot in the yarn or other dangerous condition, but since there was no electric current to the controller the knitting machine continued functioning, resulting in damage to the machine.

The dominating feature of this invention is the construction of an electric stop motion controller for knitting machine, or other machines, which will function not only upon operation of one or more of the stop motion devices, but which will also function upon current failure to the controller. With the controller thus constructed the machine is fully protected because it will be stopped upon the signalling of any one of the stop motion devices as well as upon current failure to the controller or to the stop motion devices.

Another deficiency which this invention contemplates overcoming in the old controller resides in eliminating the possibility of the controller functioning accidentally due merely to vibrations. In the old controller a spring is relied upon to hold the armature in its holding position and the electro-magnet is relied upon to move the armature from its holding to its releasing position. Since a spring is resilient there is the tendency for the armature in its holding position to vibrate. There were instances in which the resiliency of the spring varied in time from its original stiffness to such an extent that it became too weak and exceptional vibrations would set the controller off. Since these controllers are mounted on machines which naturally vibrate during operation, a soft spring constitutes an annoying feature. Manufacturers therefore equipped the controllers with strong springs. However, this construction required a relatively strong electro-magnet to knock the controller off, particularly in view of the fact that the magnetism from the electro-magnet is required to span an air gap from the end of the core of the electro-magnet to the armature. A strong electro-magnet is more expensive to manufacture than a weaker one.

It is an important object of this invention to have the electro-magnet hold the latch armature in its holding position and to have a spring to move the armature to its releasing position upon de-energization of the electro-magnet. An electro-magnet tenaciously holds its armature in contact with its core and permits no vibration whatsoever. Therefore vibrations in the machine and in the controller cannot readily accidentally set off the controller. Moreover, it is possible to use a smaller and weaker electro-magnet in the new controller because (1) it is not necessary to use a stiff and strong spring to hold the armature in its holding position, and (2) the magnetism is not required to span an air gap to the armature. In the new controller there may be a relatively delicate balance between the spring which urges the latch armature into its releasing position and the electro-magnet which holds the armature in its holding position because the electro-magnet will tenaciously hold the latch armature, permitting no vibration.

From the above it should be understood that it is an important object of this invention to construct the new electric controller so that the electro-magnet holds the latch armature in its holding position while a spring urges the latch armature into its releasing position. It is then contemplated to provide means for either weakening the electro-magnet, or de-energizing the electro-magnet when it is required to activate the controller to stop the knitting machine or other machine.

Several modified forms of the invention are disclosed in this specification to illustrate the several ways for causing the controller to knock off.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view of an electric controller, without its circuits, constructed in accordance with this invention, illustrated with the front cover plate removed and with the controller in a knocked off condition.

Fig. 2 is an elevational view of the controller shown in Fig. 1 with certain top parts removed so as to disclose interior parts, but this view illustrates the parts as they appear when the controller is in a loaded condition.

Fig. 3 is a vertical sectional view as though taken on the line 3—3 of Fig. 2, but illustrating a section through the entire controller stop motion with its circuits schematically shown and illustrating the parts in positions in which the controller is loaded.

Fig. 4 is a fragmentary schematic view of an electric controller stop motion constructed in accordance with a modified form of this invention.

Fig. 5 is another fragmentary schematic view of still another electric controller stop motion embodying another form of this invention.

The electric controller stop motion for machines, in accordance with that form of the invention illustrated in Figs. 1–3 inclusive, includes a member 10 for connection with the stop mechanism of a machine in the usual way now generally used. This member 10 is illustrated as comprising a rod 10 slidably mounted in and through a housing 11. At one end the rod 10 is provided with a handle 12 by which the controller may be loaded. At the other end the rod 10 is provided with a connector 13 for connection with the stop mechanism of a knitting machine or other machine. The rod or member 10 is associated with resilient means for urging said member 10 into a stop position in which it will operate said stop mechanism to stop said machine. This resilient means comprising a main spring 14 coaxially on the rod or member 10 and acting between one end of the housing 11 and a pawl carrier 15 mounted on the rod or member 10. A cushion spring 16 is also coaxially mounted on the rod or member 10 and acts between the other end of the housing 11 and the other side of the pawl carrier 15. The member 10 is illustrated in Fig. 1 in its stop position in which the cushion spring 16 is compressed and the main spring 14 is expanded. The loading handle 12 may be manually pulled down so as to compress the spring 14 and move the member 10 into its loaded position.

The member 10 is associated with releasable holding means for restraining said member 10 from moving into said stop position and said releasable holding means includes a releasing trip 17. Said releasable holding means is connected in between said pawl carrier 15 and said releasing trip 17. The pawl carrier 15 extends across the housing 11 and is suitably slidably guided by having a grooved end 18 engaging a guiding rod 19 mounted in the housing 11. The pawl carrier 15 is provided with a pair of lugs 20 supporting a pintle pin 21 which in turn supports a latch pawl 22. This latch pawl 22 extends beneath the pawl carrier 15 and is urged downwards by a spring 23 coaxially mounted on the pintle pin 21 and acting between the pawl carrier 15 and the latch pawl 22.

In the loaded position of the controller the latch pawl 22 rests upon a rocker arm or rocker 24 which is pivotally mounted by a pintle pin 25 upon a bracket 26 mounted upon the back wall of the housing 11. This rocker arm 24 is urged into the said position by a spring 27 coaxially mounted on the pintle pin 25 and acting between the rocker 24 and the bracket 26. The rocker 24 is provided with a counter arm 28 which engages between a hub section 29a on the releasing trip 17 and an arm 29 extending at an acute angle from the said hub section 29a of the releasing trip 17. The releasing trip 17 is pivotally mounted by pins 30 supported on the bracket 26. The releasing trip 17 is also provided with an arm 29′ similarly directed as the arm 29 and which is engageable with a partition 32 of the bracket 26 for limiting counter-clock pivoting of the releasing trip 17 from the position as illustrated in Fig. 3. The releasing trip 17 rests upon a latch armature 34 in the loaded condition of the controller. The rocker 24 extends through an opening 35 in a partition plate 36 mounted across the housing 11.

When the latch armature 34 moves to free the releasing trip 17 the spring 14 is free to move the member 10 into its stop position. The reason for this is that the pawl 22 then moves the rocker arm 24 against the action of the spring 27 and the counter arm 28 of the rocker arm 24 is capable of moving the arm 29 of the releasing trip 17 to move the releasing trip 17 towards the back edge of the latch armature 34. The controller is reloaded by pulling the handle 12 to move the member 10 to its loaded position in which the latch pawl 22 reengages the rocker arm 24 and the releasing trip 17 re-engages the latch armature 34. If further details of the releasing means is desired they may be readily understood from an examination of the patent to Vossen referred to above.

The latch armature 34 is movable from a holding position, as illustrated in Fig. 2, to a releasing position, and in its holding position holds said releasing trip 17, and in its releasing position frees said releasing trip 17 for releasing said holding means of the member 10. The latch armature 34 is pivotally mounted intermediate of its ends by a hinge 36′ upon a wall 37 of the bracket 26. A stop finger 38 is mounted on the wall 37 and has its top end spaced a slight distance beneath the latch armature 34 for limiting pivoting of the armature 34 to its releasing position. The latch armature 34 is normally urged into its holding position by a normally operative electro-magnetic means for magnetically urging and holding said armature 34 in its holding position. This electro-magnetic means includes a magnet core 39 mounted upon a section of wall 37, a winding 40 about said core 39, and an electric circuit 41.

The electric circuit 41 includes a leaf spring contact 44 which is mounted on but insulated from the partition plate 36. A contact rod 45 is mounted on the pawl carrier 15 and in the loaded position of the member 10 engages the contact spring 44, as illustrated in Fig. 3. The contact rod 45 electrically connects to the mechanism of the electric controller, which connects with the ground 46. One end of the winding 40 also connects with the ground 46, see Fig. 3. The other end of the winding 40 connects with the other line of the circuit 41. When the controller is loaded the circuit 41 is closed and current is continuously flowing through the winding 40 so that the armature 34 is attracted and held in its holding position, as illustrated in Figs. 2 and 3.

A spring 48 is mounted between the armature 34 and a support 49 mounted on the wall 37, and normally urges the armature 34 into its releasing position, which is the position it will assume when the armature 34 engages the end of the stop 38. The spring 48 urges said armature 34 into its releasing position in order to free said releasing trip 17 and stop said machine, upon current failure in said electro-magnetic means, that is, upon current failure in the circuit 41, which would cause deenergization of the winding 40 and its core 39 which is attracting and holding the armature 34 in its holding position.

Said latch armature 34 is also associated with a normally inoperative second electro-magnetic means for cancelling out enough or all of the holding action of said first named electro-magnetic means in order that said spring 48 may move said latch armature 34 into its releasing position. This normally inoperative second electro-magnetic means in this particular form of the invention includes a second winding 50 on the core 39. Said winding 50 is connected in an electric circuit 51 which connects with a plurality of stop motions 52 having normally open switches 53. These normally open switches 53 are connected in series with the winding 50 and the circuit is closed through the ground 46. The electric circuit 51 connects said stop motion 52 and said second electro-magnetic means, namely the winding 50, in order that said second electro-magnetic means may operate to cancel out enough of the holding action of said first named magnetic means which includes the winding 40, for stopping said machine upon closing of said normally opened switch or switches 53 of said stop motions 52.

The operation of the new electric controller stop motion for machines may be understood from the following:

In the knocked off position of the electric controller the circuit 41 is open because the contact rod 45 is out of contact with the leaf contact 44, as illustrated in Fig. 1. The controller is loaded by pulling the loading handle 12 so as to compress the spring 14. It is moved to a position in which the latch pawl 22 engages the rocker 24. In this position the circuit 41 is closed because the contact rod 45 engages the leaf contact 44. Instantly current flows through the winding 40 and the electro-magnet is energized so that its core 39 moves the latch armature 34 into holding position. The magnetism can easily move the latch armature 34 into its holding position because there is no load on the latch armature 34 at the instant of loading because the releasing trip 17 is indirectly held slightly frontwards of the armature by the act of loading the controller. When the controller is loaded and the handle 12 is released the releasing trip 17 moves to its on position and engages the front edge of the armature 34, as illustrated in Figs. 2 and 3. The controller is now in operation protecting the machine. In the event there is a failure of electric current in the circuit 41 due to any reason whatsoever, as for example, if the plug which connects the circuit with an electric supply is accidentally kicked out, the controller will knock off. As soon as current stops flowing in the circuit 41 it ceases to flow in the winding 40 and the electro-magnet becomes deenergized so that the spring 48 moves the armature 34 into its releasing position, freeing the releasing trip 17 and causing the controller to knock off.

A second way to set off the controller would be to close any of the stop motion switches 53. If any one of these switches close due to the natural operation of the stop motions, the circuit through the winding 50 will be closed. Immediately, by induction, a current flows in the circuit 51. This flow of current robs magnetism from the first named electro-magnetic means which includes the winding 40 so that the magnetism is weakened sufficiently for the spring 48 to move the armature 34 to its releasing position, which releases the trip 17 causing the controller to knock off.

It should be particularly noted that the new controller operates upon current failure in the circuit 41 and operates upon the closing of any of the stop motion switches 53. It should also be noted that in the on position of the controller the armature 34 is held in its holding position by magnetism due to the electro-magnet having the core 39 and winding 40. The armature 34 will be tenaciously held by the magnetism and therefore the controller is not sensitive to vibration as those controllers in which springs are used to hold each latch armature in its holding position. Moreover, the spring 48 may be balanced with the magnetism of the first named electro-magnet which includes the core 39 and winding 40 so that a relatively small unbalance of the magnetism is sufficient to let the spring 48 withdraw the armature 34 from its holding position to release the releasing trip 17.

The core 39 and windings 40 and 50 act like a transformer when current (alternating) flows through the winding 40. The winding 40 may be the high of the transformer, and any voltage may be used in it, such as 12, 110, 220, etc. The winding 50 may be wound to such low voltage as may be desirable for use in the circuit 51 so as not to be dangerous to people about the machine.

In Fig. 4 a modified form of the invention has been disclosed which distinguishes from the prior form merely in the construction and operation of the normally inoperative second electro-magnetic means for cancelling out enough or all of the holding action of the first named electro-magnetic means in order that the spring may move the latch armature into its releasing position. More particularly, this modified controller is of identical construction to the prior described controller in most parts, and like parts have been given the same reference numerals. For example the modified controller includes a member 10 for connection with the stop mechanism of a machine, resilient means 14 urging said member 10 into a stop position in which it will operate the stop mechanism to stop a machine, releasing means 62, schematically indicated by the dash line 62, for restraining said member 10 from moving into said stop position, and said releasing means including a releasing trip 17.

A latch armature 34 is movable from a holding to a releasing position and in its holding position holding said trip 17, and in its releasing position freeing said trip 17 for releasing said holding means. The armature 34 is associated with a normally operative electro-magnetic means for magnetically urging and holding said latch armature in its holding position. This electro-magnetic means includes an electro-magnet having a winding 65. This winding 65 is in an electric circuit 41a including the secondary 42 of a transformer 43. The circuit 41a also includes a leaf spring contact 44 and a contact rod 45 upon a pawl carrier 15 mounted on the rod 10. The pawl carrier 15 is connected with the ground 46 and one end of the coil 65 is also connected with the ground 46. A spring 48 urges said latch armature 34 into its releasing position in order to free said releasing trip and stop said machine upon current failure in said electro-magnetic means.

A second normally inoperative electro-magnetic means is associated with said latch armature 34 for cancelling out enough or all of the holding action of said first named electro-magnetic means in order that said spring 48 may move said latch armature 34 into its releasing position. This second electro-magnetic means includes a winding 74 connected in a circuit 51 which includes a plurality of stop motion switches 53. The windings 65 and 74 are connected in series, but the winding 74 is wound in the opposite direction to the winding 65 so as to cancel the magnetism of the winding 65.

The operation of this controller may be understood from the following:

Upon current failure in the circuit 41a the magnetism produced by the winding 65 ceases and the spring 48 will move the latch armature 34 into its releasing position. Or, upon closing of any of the stop motion switches 53 a circuit will be closed through the winding 74 and current will actually flow through the winding 74 which is wound in the opposite direction to the winding 65 causing a decrease in the magnetism which holds the armature 34. The spring 48 will therefore move the armature 34 into its releasing position. The flow of current may be traced from the secondary 42 through the leaf contact 44, the contact rod 45, the ground 46, through one of the stop motion switches 53, the winding 74, the winding 65, and back to the other end of the secondary coil 42.

In Fig. 5 another modified form of the invention has been disclosed which is very similar to the prior form, distinguishing merely in the normally inoperative second electro-magnetic means for cancelling out enough or all of the holding action of the first named electro-magnetic means in order that said spring may move said latch armature to its releasing position. In this form of the invention the first electro-magnetic means includes the winding 65' and the electric circuit 41a. The second electro-magnetic means is in the nature of an electro-magnetic relay 80 which controls the circuit 41a. The coil of the electro-magnetic relay 80 is connected in a circuit 75 which includes stop motion switches 53. This circuit 75 is connected in parallel with the circuit 41a as shown on the drawing. In other respects this form of the invention is identical to the previous forms and like parts are indicated by like reference numerals.

The operation of this form of the invention may be understood from the following:

Upon current failure in the circuit 41a current will cease flowing in the winding 65' so that the spring 48 moves the latch armature 34 into its releasing position which frees the trip 17, whereupon the controller knocks off. Upon closing of any of the switches 53 current will flow in the circuit 75 causing the relay 80 to operate which interrupts flow of current through circuit 41a and in the winding 65', whereupon the first electro-magnet is de-energized and the spring 48 moves the armature 34 into its releasing position which frees the trip 17, whereupon the controller knocks off.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. An electric controller stop motion for machines, comprising a member for connection with the stop mechanism of a machine, resilient means urging said member into a stop position in which it will operate said mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out enough or all of the holding action of said first named electro-magnetic means in order that said spring may move said latch armature into its releasing position, and an electric circuit connecting said stop motion and said second electro-magnetic means in order that said second electro-magnetic means operates to cancel out enough of the holding action of said first named electro-magnetic means for stopping said machine upon closing of said normally open switch of said stop motion.

2. An electric controller stop motion for machines, comprising a member for connection with the stop mechanism of a machine, resilient means urging said member into a stop position in which it will operate said stop mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out magnetically enough or all of the holding action of said first named electro-magnetic means in order that said spring may move said latch armature into its releasing position, and an electric circuit connecting said stop motion and said second electro-magnetic means in order that said second electro-magnetic means operates to cancel out enough of the holding action of said first named electro-magnetic means for stopping said machine upon closing of said normally open switch of said stop motion.

3. An electric controller stop motion for machines, comprising a member for connection with the stop mechanism of a machine, resilient means urging said member into a stop position in which it will operate said stop mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out electrically enough or all of the holding action of said first named electro-magnetic means in order that said spring may move said latch armature into its releasing position, and an electric circuit connecting said stop motion and said second electro-magnetic means in order that said second electro-magnetic means operates to cancel out enough of the holding action of said first named electro-magnetic means for stopping said machine upon closing of said normally open switch of said stop motion.

4. An electric controller stop motion for machines, comprising a member for connection with the stop mechanism of a machine, resilient means urging said member into a stop position in which it will operate said stop mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out enough or all of the holding action of said first named electro-magnetic means in order that said spring may move said latch armature into its releasing position, and an electric circuit connecting said stop motion and said second electro-magnetic means in order that said second electro-magnetic means operates to cancel out enough of the holding action of said first named electro-magnetic means magnetic means for stopping said machine upon closing of said normally open switch of said stop motion said first named electro-magnetic means comprising an electric magnet, and an electric circuit for energizing said electric magnet.

5. An electric controller stop motion for machines, comprising a member for connection with the stop mechanism of a machine, resilient means urging said member into a stop position in which it will operate said stop mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out enough or all of the holding action of said first named electro-magnetic means in order that said spring may move said latch armature into its releasing position, and an electric circuit connecting said stop motion and said second electro-magnetic means in order that said second electro-magnetic means operates to cancel out enough of the holding action of said first named electro-magnetic means for stopping said machine upon closing of said normally open switch of said stop motion, said second electro-magnet means comprising a normally closed relay having its winding in said electric circuit and having its normally closed switch section controlling the operation of said first named electro-magnetic means.

6. An electric controller stop motion for machines, comprising a member for connection with the stop mechanism of a machine, resilient means urging said member into a stop position in which it will operate said stop mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out enough or all of the holding action of said first named electro-magnetic means in order that said spring may move said latch armature into its releasing position, and an electric circuit connecting said stop motion and said second electro-magnetic means in order that said second electro-magnetic means operates to cancel out enough of the holding action of said first named electro-magnetic means for stopping said machine upon closing of said normally open switch of said stop motion, said normally operative electro-magnetic means including a magnet core and an electric winding about said core, and said normally inoperative second electro-magnetic means including an electric winding on said core inductively associated with said first named electric winding in the nature of a transformer, and said second electric winding being in said electric circuit.

7. An electric controller stop motion for machines, comprising a member for connection with the stop mechanism of a machine, resilient means urging said member into a stop position in which it will operate said stop mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out enough or all of the holding action of said first named electro-magnetic means in order that said spring may move said latch armature into its releasing position, and an electric circuit connecting said stop motion and said second electromagnetic means in order that said second electromagnetic means operates to cancel out enough of the holding action of said first named electromagnetic means for stopping said machine upon closing of said normally open switch of said stop motion, said normally operative electro-magnetic means including a magnet core and an electric winding to give said core one polarity, and said normally inoperative second electro-magnetic means including an electric winding which when energized neutralizes the polarity of said core.

8. An electric controller stop motion for machines, comprising a member for connection with the stop mechanism of a machine, resilient means urging said member into a stop position in which it will operate said stop mechanism to stop said machine, releasable holding means for restraining said member from moving into said stop position and including a releasing trip, a latch armature movable from a holding to a releasing position and in its holding position holding said trip and in its releasing position freeing said trip for releasing said holding means, a normally operative electro-magnetic means for magnetically urging and holding said latch armature into its holding position, a spring for urging said latch armature into its releasing position in order to free said releasing trip and stop said machine upon current failure in said electro-magnetic means, a stop motion for said machine and having a normally open switch, a normally inoperative second electro-magnetic means for cancelling out enough or all of the holding action of said first named electro-magnetic means in order that said spring may move said latch armature into its releasing position, and an electric circuit connecting said stop motion and said second electromagnetic means in order that said second electromagnetic means operates to cancel out enough of the holding action of said first named electromagnetic means for stopping said machine upon closing of said normally open switch of said stop motion, a normally closed switch in said electric circuit, and means for opening said normally closed switch when said member is moved to its stop position.

EDWARD VOSSEN.

No references cited.